P. J. HEININGER.
HOSE COUPLING.
APPLICATION FILED MAY 24, 1919.
1,361,856.
Patented Dec. 14, 1920.
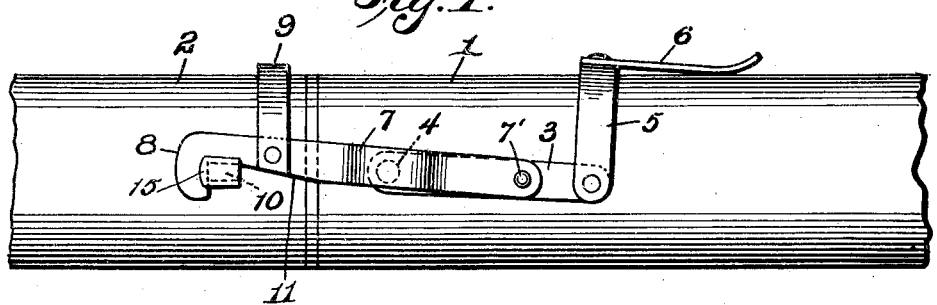
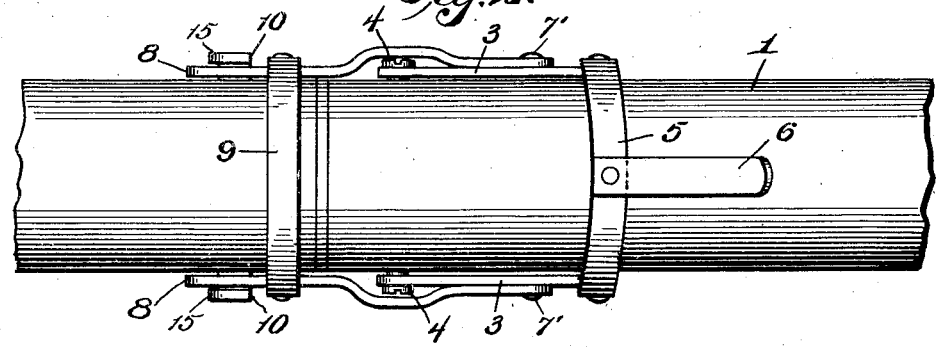
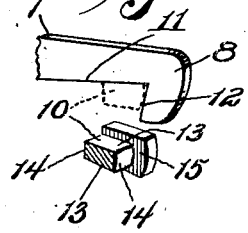
Inventor
P. J. Heininger
Attorney

UNITED STATES PATENT OFFICE.

PETER J. HEININGER, OF PLYMOUTH, FLORIDA.

HOSE-COUPLING.

1,361,856.          Specification of Letters Patent.     Patented Dec. 14, 1920.

Application filed May 24, 1919. Serial No. 299,410.

*To all whom it may concern:*

Be it known that I, PETER J. HEININGER, a citizen of the United States, residing at Plymouth, in the county of Orange and State of Florida, have invented new and useful Improvements in Hose-Couplings, of which the following is a specification.

This invention relates to hose couplers, the object of the invention being to provide a device of simple construction for rapidly and conveniently coupling and uncoupling hose sections, and one in which the fastening connections will exert a wedging action to draw the hose sections securely together, while at the same time maintaining the fastening connections to securely hold the hose sections in coupled relation.

The invention consists of the features of construction, combination and arrangement of parts hereinafter fully described and claimed, reference being had to the accompanying drawing, in which:—

Figure 1 is a view in side elevation showing hose sections connected by the improved coupler.

Fig. 2 is a top plan view of the same.

Fig. 3 is a detail view of the hooked end of one of the latch bars and one of the locking studs.

Referring to the drawing, 1 and 2 designate the adjacent ends of a pair of hose pipe sections, which ends of the hose pipe sections are adapted to fit together in any suitable manner and to be coupled by my improved fastener.

The fastener comprises a pair of lever bars 3 arranged on opposite sides of the hose section 1 and pivotally mounted at their outer ends thereto as indicated at 4, the relatively inner ends of said lever bars 3 being united by a U-shaped or semi-circular cross bar 5 to which is applied a rearwardly extending strip 6 forming a manipulating handle. When the latch bars 3 are in locking position said bars lie longitudinally of and substantially in a plane parallel with the longitudinal axis of the pipe section 1, while the cross bar 5 snugly embraces said pipe section and permits the handle 6 to lie in close engagement therewith.

The means actuated by the lever bars 3 for locking the hose pipe sections together comprises a pair of latch bars 7 arranged on opposite sides of the section 1, along the outer faces of the lever bars 3, and projecting outwardly and forwardly therefrom, said latch bars having hooked free ends 8 connected and reinforced by a U-shaped or semi-circular cross bar 9 and adapted to project in advance of the end of the hose section 1 and lap the adjacent end of the hose section 2 for interlocking engagement with studs 10 upon the latter named hose section.

The rear ends of the latch bars 7 are pivotally connected, as at 7', with the lever bars 3 and the transverse centers thereof, the construction being such that when the parts are in locking position the latch bars will lie substantially in longitudinal alinement with the lever bars, and the cross bar 9 will rest upon the hose section 2 and limit the inward movement of the latch hooks 8, while when the handle 6 and the latch bars 3 are swung upwardly and forwardly, the rear pivoted ends of the latch bar 7 will be swung upwardly and forwardly therewith, thereby moving the hooked ends 8 of the latches forwardly out of engagement with the studs 10 and at the same time elevating said hooked ends of the latches, whereby the locking members will be quickly and conveniently released to permit separation of the hose sections.

The latch members 7 and studs 10 are of novel form and construction in order to secure a frictional binding and wedging engagement between them in order to draw the hose sections 1 and 2 together during the interlocking action and at the same time couple the hooks 8 with the studs 10 so as to obviate any liability of disengagement of the same from the studs, as long as the pivots of the latch and lever bars are in longitudinal alinement, as shown in Fig. 1, and until the joint is broken by moving said pivots out of alinement in the manner previously described. To this end the inner longitudinal edge of the free end of each latch bar 7 is formed with an upwardly and forwardly inclined surface 11, while the inner edge of the hook 8 is provided with an inclined surface 12, extending at an oblique angle to the edge 11, thus forming a substantially V-shaped recess at their angle of intersection, while the stud 10 is made of oblong rectangular form with substantially flat side faces 13 and end faces 14. By this construction the inclined surface 12 of the latch hook 8 is adapted, when engaged with one of the faces 14, to exert a wedging action thereon, and then to pass beneath said face so as to lie in a plane in rear thereof, the result being that the hose sections 1 and 2 will be drawn together firmly during the locking action and that the extremities of the inclined faces 12 of the hooks 8 will engage under the surface 14 and thereby lock the hook and stud against accidental separation until the levers 3 are moved to releasing position. It will be evident that in this operation the inclined faces 11 of the latch bars 7 play an important part in providing sufficient space for the accommodation of the studs 10, which are received within the V-shaped recesses, as indicated in dotted lines in Fig. 3. It will also be seen that the inclined surfaces 11 permit the lever bars 3 and latch bars 7 to lie in longitudinal alinement so that said parts will lie at a slight angle to the longitudinal axis of the hose, bringing the edges 11 at a point below the pivots 4 in which they are normally retained by friction and gravity by the weight of the latch bars, thus further adding to the security of the connection.

The studs 10 are preferably provided at their outer sides with guard plates 15 projecting beyond the faces 13 and the outer end face 14, said guard plates engaging the outer sides of the hooked ends of the latches, when the latter are in engaging position, to maintain the latches in proper relative position and obviate liability of outward lateral movement thereof.

Having thus fully described my invention, I claim:—

1. Means for coupling adjacent ends of pipe members together, said means comprising operating levers pivoted medially of and at opposite sides of one of the pipe members, studs projecting at opposite sides of the other of the pipe members and in alinement with the pivots of said operating levers, coupling levers pivoted to said operating levers and having hooked ends adapted for engagement with said studs, a cross-bar connecting said coupling levers at points immediately adjacent the hooked ends thereof, a second cross-bar connecting said operating levers adjacent the free ends thereof, and an actuating handle carried by said second cross-bar.

2. Means for coupling abutting ends of alining pipe members together, said means comprising operating levers pivoted at their outer ends medially of and at opposite sides of one of the pipe members adjacent the end thereof, studs projecting at opposite sides of the other of the pipe members and in alinement with the pivots of said operating levers, couplng levers pivotally connecting said operating levers intermediate the ends and on the outer faces thereof, the forward portions of said coupling levers being bent into alinement with said operating levers and having hooked ends adapted to engage over said studs, a cross-bar connecting said coupling levers at points immediately adjacent the hooked ends thereof, a second cross-bar connecting said operating levers adjacent the inner ends thereof, and an actuating handle carried by second cross-bar.

3. Means for coupling abutting ends of alining pipe members together, said means comprising operating levers pivoted at their outer ends medially of and at opposite sides of one of the pipe members adjacent the end thereof, wedge-shaped studs projecting at opposite sides of the other of the pipe members and in alinement with the pivots of said operating levers, coupling levers pivotally connecting said operating levers intermediate the ends and on the outer faces thereof, the forward portions of said coupling levers being bent into alinement with said operating levers and having hooked ends adapted to engage over said studs, guard plates formed at the outer ends of said wedge-shaped studs to hold the hooked ends of said coupling levers against lateral displacement, a cross-bar connecting said coupling levers at points immediately adjacent the hooked ends thereof, a second cross-bar connecting said operating levers adjacent the inner ends thereof, and an actuating handle carried by said second cross-bar.

4. Means for coupling abutting ends of alining pipe members together, said means comprising operating levers pivoted at their outer ends medially of and at opposite sides of one of the pipe members adjacent the end thereof, wedge-shaped studs projecting at opposite sides of the other of the pipe members and in alinement with the pivots of said operating levers, coupling levers pivotally connecting said operating levers intermediate the ends and on the outer faces thereof, the forward portions of said coupling levers being bent into alinement with said operating levers and having hooked ends adapted to engage over said studs, guard plates formed at the outer ends of said wedge-shaped studs to hold the hooked ends of said coupling levers against lateral displacement, a semicircular cross-bar connecting said coupling levers at points immediately adjacent the hooked ends thereof, a second semi-circular cross-bar connecting said operating levers adjacent the inner ends thereof, and an actuating handle carried by said second cross-bar, said levers and said semi-circular cross-bars being disposed in close relation with respect to the opposed surfaces of the pipe members when in operative position.

In testimony whereof I affix my signature.

PETER J. HEININGER.